Patented Dec. 11, 1934                                          1,983,731

UNITED STATES PATENT OFFICE 1,983,731

CAOUTCHOUC-LIKE MATERIAL

Robert Beyer, Brooklyn, N. Y., assignor to Robert Beyer Corporation, a corporation of New York No Drawing. Application January 28, 1930
Serial No. 424,129

20 Claims. (Cl. 106—23)

This invention relates to caoutchouc-like material and has for its object the provision, as a new article of manufacture, of a novel caoutchouc-like material and a method of making the same. More particularly the invention aims to provide a novel caoutchouc-like conversion product of carbohydrate, such as starch, displaying physical characteristics similar to natural caoutchouc, and a method of making such material.

The heretofore customary methods of synthesizing caoutchouc-like compounds produce only materials which display but a minor part of the physical characteristics of natural caoutchouc and which can only be used in relatively small quantities along with natural caoutchouc. This is more particularly true when it is sought to obtain the soft resilient types of vulcanized rubber which are customary in automobile tires and tubes. The heretofore synthesized caoutchouc-like compounds may be used in relatively larger quantities when hard rubber products are being produced where properties of resiliency, flexibility and elasticity are not sought after.

In the heretofore customary methods of synthesizing caoutchouc-like materials, as notable in Germany during the World War, it has been customary to attempt to reverse the known stages in the destructive distillation of natural caoutchouc. Thus it is known that the breaking down of natural caoutchouc produces isoprene (methylbutadiene). The synthesis of isoprene is known and as a consequence this substance has been commonly suggested and used as the starting point in the production of caoutchouc-like compounds. Dimethylbutadiene and erythrene have also been used as starting points in rubber synthesis. Starting with isoprene or similar substances, polymerization is depended upon to give caoutchouc or rubber.

Various methods have been suggested and used to polymerize isoprene and the like, chief of which are heat polymerization, sodium polymerization and sodium-carbondioxide polymerization. A cold polymerization product suitable only for hard rubber has been produced by holding dimethylbutadiene at a temperature of 30° C. for three months, small amounts of already polymerized material being added to hasten the process. Only the heat polymerization method has ever attained any considerable commercial importance. This method produced in Germany during the World War a substantial tonnage of material which mixed with available stocks of natural rubber materially extended the latter.

Caoutchouc-like material made by these heretofore customary methods lacks plasticity, and must be treated with special care on the rubber mills. In some cases it is even necessary to add certain oils in order to work the material at all on the mills. The material is unstable, making it necessary to add basic substances in the nature of piperidine, aldehyde ammonia or 1.8 diaminonaphthalene. These substances protect the caoutchouc-like material from decomposition and also act to accelerate vulcanization. These heretofore synthesized caoutchouc-like materials also lack elasticity, and basic oils and even mineral oils are added to overcome this difficulty. These materials are also deficient in adhesive strength.

I have discovered that a carbohydrate such as starch can be converted into a caoutchouc-like material which behaves in substantially all important respects like natural caoutchouc, and which vulcanizes with the customary compounding agents to form a vulcanized product possessing substantially the characteristic properties, and to substantially the same degree, of vulcanized natural caoutchouc. The method of my present invention, based on that discovery, contemplates a process of converting a carbohydrate like starch to such caoutchouc-like material.

In one aspect, the invention is characterized by carrying out the conversion of the carbohydrate, such as starch, in the presence of water and a salt conducive to the conversion phenomenon. In practice, I have obtained the optimum results with calcium chloride preferably in conjunction with zinc chloride. The caoutchouc-like conversion product is initially formed in an emulsoid condition, resembling natural caoutchouc latex, and may be coagulated in any appropriate manner. The coagulated product when washed, sheeted on a rubber mill and dried, displays both chemical and physical characteristics remarkably similar to those of natural (crepe) caoutchouc.

In the actual practice of the invention, I have obtained the most satisfactory yields and optimum results with starches of sub-soil origin, such, for example, as potato starch, cassava starch, and the like. I have found that crude and unrefined starches appear better suited for the practice of the invention than highly refined or purified starches. It is my present belief that the conversion treatment of the invention involves some bio-chemical activity conducive to the conversion of the carbohydrate to caoutchouc-like material. It seems probable that such bio-chemical activity is brought about by an enzyme or other bio-chemical agent naturally present in crude potato and cassava starches as well as in other starches whose process of manufacture is not destructive of and/or forms such an enzyme or other bio-chemical agent. I have found that the amenability of many starches to the conversion treatment of the invention may be substantially promoted by blending or mixing such a starch with one found to be readily amenable to conversion. Thus, I have found that a highly refined starch (such as refined corn and rice starches) when mixed or blended with crude cassava starch responds satisfactorily to the conversion treatment of the invention. Other carbohydrates, such, for example, as cellulose, if not directly amenable to the conversion treatment of the invention, may be rendered so, to some extent at least, by mixing or blending with a starch known to be readily amenable to the conversion treatment. Indeed, it is my present belief that a starch readily amenable to the conversion treatment of the invention may be treated to separate or isolate therefrom the agent or constituent thereof which contributes beneficially towards or perhaps is even responsible for the conversion, and that such isolated agent or constituent may be added to or blended with a starch or other carbohydrate deficient in amenability to the conversion treatment.

In another aspect, the invention is accordingly characterized by carrying out the conversion treatment under conditions of bio-chemical activity conducive to the conversion of the carbohydrate to caoutchouc-like material. Such biochemical activity preferably originates in the carbohydrate undergoing conversion, but may be induced therein from some other appropriate origin or source, such for example as a crude starch of sub-soil origin.

It is further characteristic of the conversion treatment of the invention that the reactions and phenomena involved proceed at moderate temperatures approximating normal room temperatures, or only slightly higher. High temperatures, such as 150–200° F., should be avoided during the conversion treatment as well as in any previous treatment of the carbohydrate to be converted. Thus, I have found that heating a crude cassava starch to about 200° F. so impairs or destroys its amenability to the conversion treatment as to make its use commercially impracticable.

The method of the invention may be carried out in various ways. By way of illustration, I will now describe my present preferred practice, concluding with a specific example thereof. It is to be understood, however, that I do not intend or wish to be restricted to or bound by any explanations of reactions or phenomena which I give in an attempt to elucidate my present conception of the conversion process.

The carbohydrate such as starch is wetted with water and brought in intimate contact with calcium chloride preferably in conjunction with zinc chloride. The starch may be mixed dry with the calcium chloride and zinc chloride and the mixture added to water, or the dry starch may be added to and mixed with an aqueous solution of the chlorides. The mixing should be sufficiently thorough to wet and swell substantially all of the starch grains. It is my preferred practice to use such an amount of water that the ultimate mixture is a mucilaginous colloidal mass. Greater amounts of water may be used, but it has been my experience that conversion proceeds more slowly in such cases.

In the course of the conversion treatment, the carbohydrate molecule is converted into a hydrocarbon molecule. It is my belief that this conversion begins to take place as soon as the carbohydrate is wetted with water in the presence of the chlorides, and progresses to completion in an interval of time depending upon the nature and relative proportions of the raw materials, the temperature and other conditions. In accordance with my present preferred practice, the mixed mucilaginous mass of carbohydrate, water and chlorides is permitted to stand quiescent in pails, tubs or other appropriate containers at a temperature of from 45 to 90° F. for a period of a few hours to several days, whereupon a substantial conversion of the carbohydrate to the hydrocarbon takes place.

I have found that the conversion treatment is promoted and made more uniform and certain by treatment of the mixed carbohydrate, water and chlorides wth a metallic soap and a solvent thereof. I have obtained very satisfactory results in practice with aluminum palmitate and benzol. The mixed mucilaginous mass may be treated with a solution of the metallic soap in its solvent, such as a solution of aluminum palmitate in benzol. It is, however, my preferred practice to mix the dry metallic soap with the dry carbohydrate material and to introduce this mixture into an aqueous solution of the chlorides, and to agitate the resulting mixture until it forms a mucilaginous mass. Benzol, or other solvent of the metallic soap, is then added to and thoroughly mixed with the resulting mucilaginous mass. The benzol wets and perhaps peptizes the metallic soap which up to this stage has been merely occluded in the mucilaginous mass. When thus wet or peptized, the metallic soap brings about a physical change in the mass evidenced by an increase in its mucilaginous and colloidal nature.

It is my belief that the metallic soap acts in the nature of a protective colloid. All of the metallic soaps in the nature of aluminum palmitate appear to bring the other colloids in the mass into a proper physical condition for conversion, but I have found that metallic soaps having substantial water-repellent power give the best results. Metallic soaps which have substantial affinity for water or a large water-holding capacity give relatively poor results. Thus, metallic soaps like zinc stearate which mix with water only with great difficulty give better results than those which are more easily wetted with water. The treatment with the metallic soap, while not essential to the conversion of the carbohydrate to the hydrocarbon, contributes a beneficial and favorable effect on the conversion treatment.

When conversion has proceeded until a substantial yield of caoutchouc-like material has resulted, coagulation of the conversion product is effected in any appropriate manner, as for example by treatment with any appropriate coagulant, by spraying, etc. It is my present preferred practice to immerse the emulsoid product of the conversion treatment in an appropriate liquid coagulant, such as a dilute solution of formic acid.

The coagulated caoutchouc-like material is thoroughly washed, preferably by soaking in water, and is then sheeted, and simultaneously further washed, on a rubber mill. The sheeted material is dried and may be used in the same way as natural crepe caoutchouc.

I now give a specific example of the practice of the invention, although it is to be understood that this example is purely illustrative and in no sense restrictive. The materials and proportions specified are those with which I have secured very satisfactory results in actual practice.

An aqueous solution of calcium and zinc chlorides is first prepared by dissolving 4½ pounds (2041 grams) of calcium chloride and 1¼ pounds (567 grams) of zinc chloride in from 3500 cc. to 6000 cc. about 3½ to 6 quarts) of water. Customarily, I use about 4500 cc. (about 4½ quarts) of water. The solution of the chlorides in water is attended by a rise in temperature. The ultimate temperature of the solution will generally be 70-90° F., depending upon the heat-conductivity of the walls of the container, the room temperature and the initial temperature of the water. I have found it convenient to carry out the solution of the chlorides in the mixing device (such as an ordinary dough mixer) in which the subsequent mixing operations are carried out.

Five pounds (2268 grams) of starch, such as crude potato or cassava starch, are mixed dry with 10.29 ounces avoirdupois (292 grams) of aluminum palmitate. This mixture is added to the aqueous solution of the chlorides with constant agitation. As mixing progresses, the starch grains become wetted and swell until ultimately the mixture becomes a thick, mucilaginous, colloidal mass. The mixing and agitation of this mass may be continued for as long a time as may seem necessary or beneficial. It is my present belief that the contemplated conversion is promoted by mixing or agitating the mass for from one to three hours. I have, however, obtained satisfactory results with a mixing period of only ten minutes.

When it appears that substantially all of the starch grains are penetrated with the salt solution and an appropriate colloidal state has been attained, benzol is added to the mass, preferably in the mixing device with constant agitation. In the example under discussion, from 500 to 3000 cc. (about ½ to 3 quarts) of benzol gives the desired result. The mixing device is preferably closed during the treatment of the mass with benzol, in order to prevent evaporation of the benzol, and mixing is continued for a period of a few minutes to an hour or more.

Following the benzol treatment the mass is permitted to stand quiescent for a period of from one day to a week or more. It appears advantageous to maintain the mass at a temperature of from 75-90° F. during this stage, although satisfactory results have been attained at lower temperatures. During this stage, the mass loses its colloidal appearance and becomes a white or grayish emulsion. The surface of the mass may lose moisture and become of a brownish translucent texture. This surface film or coating is tough and more or less elastic and may be vulcanized directly with sulfur.

The white or grayish conversion product is a pasty emulsion of caoutchouc-like hydrocarbon particles, resembling natural caoutchouc latex. It is my preferred practice to coagulate the conversion product by introducing it into a weak aqueous solution (5 to 10%) of formic acid. The coagulated material is permitted to stand in contact with the acid for from 1 to 48 hours, when it is transferred to a leaching bath of water, preferably slightly warm. In the leaching bath, the salts in the coagulated material appear to dialyze out into the surrounding water.

The washed or leached material is then slightly warmed by immersion in warm water and passed directly to a pair of washing rubber rolls. As the material passes through the rolls and as fresh surfaces are exposed, further salts are washed out by warm water continuously passing over the material on the rolls. When washing is complete, the material is sheeted out from the rolls in thin sheets and exposed to appropriate conditions for drying. These sheets are customarily dried to a moisture content of less than 2%. The resulting caoutchouc-like material is then ready for compounding and vulcanization.

The action of the mixed calcium chloride and zinc chloride, or equivalent salt or salts, is not completely understood. It appears probable that these salts act in the nature of catalysts. It is my present belief that these salts activate the conversion phenomenon, and that the presence of such a salt is essential for initiating conversion. Thus, conversion will not proceed to any appropriate extent in the absence of such an activating salt, all other conditions being the same. It may be that such an activating salt appropriately conditions or degrades the carbohydrate for conversion to hydrocarbon by an enzyme or other bio-chemical agent naturally present in the carbohydrate, or it may be that the salt provides an appropriate environment for the activity of such an enzyme or other bio-chemical agent.

The quiescent stage of the conversion treatment, usually lasting from two to several days, may be a digesting or degrading stage, since it appears that what takes place in this stage is a progressive degradation of the particles of the original starch which have not been promptly changed over to hydrocarbon. It is possible that this stage breaks down the proteins and albuminoids of the starch and also those starch grains not originally in such form as to be readily changed over to hydrocarbon. Such starch grains may be composed of aggregates which have not been thoroughly penetrated with the salt solution, or may be individual particles having such a structural form as not to lend themselves readily to the conversion treatment. Greater density of some starch grains may make a greater time necessary for complete penetration of the salt solution, and thus may account for the time lag and the progressive action of the agent or agents primarily responsible for the conversion. It is my present belief that during both the mixing and quiescent stages a progressive conversion of carbohydrate to hydrocarbon takes place and that the more resistant particles of carbohydrate are gradually attacked or appropriately conditioned and converted to hydrocarbon.

The exact chemical changes taking place during the conversion treatment are not now definitely known or fully understood. It appears that the periods of greatest change chemically are closely associated with the periods of greatest change physically and colloidally. Such periods occur in the initial mixing stage when the first mucilaginous colloidal mass is formed and again during the quiescent or degrading stage when the mass loses its mucilaginous colloidal character and assumes a pasty, emulsion condition. Both of these stages are accompanied by a radical change in physical characteristics of the mass and each is usually accomplished in a mildly warm state.

The caoutchouc-like material of the invention displays both chemical and physical characteristics remarkably similar to those of natural caoutchouc. It is slightly more opaque than the usual natural crepe rubbers, and apparently has less resiliency and toughness but somewhat the same tackiness. Upon vucanization, it produces a product possessing good tensile strength, good elasticity and good ageing qualities. Vulcanization takes place substantially faster than in the case of natural caoutchouc. A possible explanation of the acceleration of the rate of cure may be accounted for by the presence in the material of nitrogenous and possibly albuminous substances originating in the starch. Unlike natural caoutchouc, the material of the invention is substantially neutral, its water extract giving neither an acid nor alkaline reaction. Chemically, the caoutchouc-like material of the invention is a hydrocarbon with which is associated about the same small percentages of other (non-caoutchouc-like) substances as in natural caoutchouc. In other words, substances or constituents foreign to the caoutchouc molecules are present in the material of the invention in substantially the same relative proportions as in natural caoutchouc. It may be that certain proteins, albumenoids, or the like are substituted in the material of the invention for the resins and fatty acids normally present in natural caoutchouc.

When prepared under favorable conditions, and more particularly in the absence of the metallic soap, the hydrocarbon content of the material has a molecular structure substantially identical with natural caoutchouc. Thus, when subjected to the X-ray examination described by George L. Clark in the India Rubber World of February 1, 1929, pages 25-29, this caoutchouc-like material gives a photographic diffraction pattern of a hydrocarbon molecular structure similar to that of natural caoutchouc as illustrated in Fig. 2 of that article. This X-ray examination shows the practically complete absence in the material of the invention of any carbohydrate, thus demonstrating the complete conversion of the carbohydrate of starch to the hydrocarbon of caoutchouc, and further shows a graining similar to that which is characteristic of only natural caoutchouc.

I claim:—

1. The method of making caoutchouc-like material which comprises mixing starch with water in the presence of a soluble metallic chloride at temperatures not substantially higher than room temperatures adapted to form a mucilaginous mass of material, treating the resulting mass with aluminum palmitate allowing the mass to stand and permitting conversion to proceed until a substantial yield of caoutchouc-like material has been obtained, and then coagulating the resulting caoutchouc-like material.

2. The method of making caoutchouc-like material which comprises mixing starch with water in the presence of a soluble metallic chloride at temperatures not substantially higher than room temperatures adapted to form a mucilaginous mass of material, treating the resulting mass with a metallic soap having substantially water-repellent power, allowing the mass to stand and permitting conversion to proceed until a substantial yield of caoutchouc-like material has been obtained, and then coagulating the resulting caoutchouc-like material.

3. The method of making caoutchouc-like material which comprises mixing starch with water in the presence of calcium chloride at temperatures not substantially higher than room temperatures and forming a mucilaginous mass of material, treating the resulting mass with a metallic soap having substantially water-repellent power, allowing the mass to stand and permitting conversion to proceed until a substantial yield of caoutchouc-like material has been obtained, and then coagulating the resulting caoutchouc-like material.

4. The method of making caoutchouc-like material which comprises mixing starch with water in the presence of zinc chloride at temperatures not substantially higher than room temperatures and forming a mucilaginous mass of material, treating the resulting mass with a metallic soap having substantially water-repellent power, allowing the mass to stand and permitting conversion to proceed until a substantial yield of caoutchouc-like material has been obtained, and then coagulating the resulting caoutchouc-like material.

5. The method of making caoutchouc-like material which comprises mixing starch with water in the presence of calcium chloride and zinc chloride at temperatures not substantially higher than room temperatures and forming a mucilaginous mass of material, treating the resulting mass with a metallic soap having substantially water-repellant power, allowing the mass to stand and permitting conversion to proceed until a substantial yield of caoutchouc-like material has been obtained, and then coagulating the resulting caoutchouc-like material.

6. The method of making caoutchouc-like material which comprises mixing starch with water in the presence of a soluble metallic chloride at temperatures not substantially higher than room temperatures adapted to form a mucilaginous mass of material, treating the resulting mass with aluminum palmitate and a solvent thereof allowing the mass to stand and permitting conversion to proceed until a substantial yield of caoutchouc-like material has been obtained, and coagulating the resulting caoutchouc-like material.

7. The method of making caoutchouc-like material which comprises mixing starch with water in the presence of a soluble metallic chloride at temperatures not substantially higher than room temperatures adapted to form a mucilaginous mass of material, treating the resulting mass with a metallic soap having substantially water-repellent power and a solvent thereof allowing the mass to stand and permitting conversion to proceed until a substantial yield of caoutchouc-like material has been obtained, and then coagulating the resulting caoutchouc-like material.

8. The method of making caoutchouc-like material which comprises mixing starch with water in the presence of calcium chloride at temperatures not substantially higher than room temperatures and forming a mucilaginous mass of material, treating the resulting mass with a metallic soap having substantially water-repellent power and a solvent thereof allowing the mass to stand and permitting conversion to proceed until a substantial yield of caoutchouc-like material has been obtained, and then coagulating the resulting caoutchouc-like material.

9. The method of making caoutchouc-like material which comprises mixing starch with water in the presence of zinc chloride and forming a mucilaginous mass of material, treating the resulting mass with a metallic soap having substantially water-repellent power and a solvent thereof allowing the mass to stand and permitting conversion to proceed until a substantial yield of caoutchouc-like material has been obtained, and then coagulating the resulting caoutchouc-like material.

10. The method of making caoutchouc-like material which comprises mixing starch with water in the presence of calcium chloride and zinc chloride at temperatures not substantially higher than room temperatures and forming a mucilaginous mass of material, treating the resulting mass with a metallic soap having substantially water-repellent power and a solvent thereof allowing the mass to stand and permitting conversion to proceed until a substantial yield of caoutchouc-like material has been obtained, and then coagulating the resulting caoutchouc-like material.

11. The method of making caoutchouc-like material which comprises introducing starch and a metallic soap having substantially water-repellent power into an aqueous solution of a soluble metallic chloride adapted to gelatinize the mixture and agitating the resulting mixture maintained at temperatures not substantially higher than room temperatures until it forms a mucilaginous mass, allowing the mass to stand and permitting the resulting mass to remain quiescent for such length of time as is necessary to obtain a substantial yield of caoutchouc-like material, and coagulating the resulting caoutchouc-like material by treatment with a coagulant.

12. The method of making caoutchouc-like material which comprises introducing starch and aluminum palmitate into an aqueous solution of a soluble metallic chloride and agitating the resulting mixture maintained at temperatures not substantially higher than room temperatures until it forms a mucilaginous mass, treating said mass with benzol, permitting the so treated mass to remain quiescent for such length of time as is necessary to obtain a substantial yield of caoutchouc-like material, and then coagulating the resulting caoutchouc-like material by treatment with an aqueous solution of formic acid.

13. The method of making caoutchouc-like material which comprises introducing starch and a metallic soap having substantially water-repellent power into an aqueous solution of a chloride and agitating the resulting mixture maintained at temperatures not substantially higher than room temperatures until it forms a mucilaginous mass, permitting the resulting mass to remain quiescent for such length of time as is necessary to obtain a substantial yield of caoutchouc-like material, and then coagulating the resulting caoutchouc-like material by treatment with a coagulant.

14. The method of making caoutchouc-like material which comprises introducing starch and a metallic soap having substantially water-repellent power into an aqueous solution of a soluble metallic chloride and agitating the resulting mixture maintained at temperatures not substantially higher than room temperatures until it forms a mucilaginous mass, treating said mass with a solvent of the metallic soap, permitting the so-treated mass to remain quiescent for such length of time as is necessary to obtain a substantial yield of caoutchouc-like material, and then coagulating the resulting caoutchouc-like material by treatment with a coagulant.

15. The method of making caoutchouc-like material which comprises introducing starch and a metallic soap having substantially water-repellent power into an aqueous solution of calcium chloride and agitating the resulting mixture maintained at temperatures not substantially higher than room temperatures until it forms a mucilaginous mass, permitting the resulting mass to remain quiescent for such length of time as is necessary to obtain a substantial yield of caoutchouc-like material, and then coagulating the resulting caoutchouc-like material by treatment with a coagulant.

16. The method of making caoutchouc-like material which comprises introducing starch and a metallic soap having substantially water-repellent power into an aqueous solution of zinc chloride and agitating the resulting mixture maintained at temperatures not substantially higher than room temperatures until it forms a mucilaginous mass, permitting the resulting mass to remain quiescent for such length of time as is necessary to obtain a substantial yield of caoutchouc-like material, and then coagulating the resulting caoutchouc-like material by treatment with a coagulant.

17. The method of making caoutchouc-like material which comprises introducing starch and a metallic soap having substantially water-repellent power into an aqueous solution of calcium chloride and zinc chloride and agitating the resulting mixture maintained at temperatures not substantially higher than room temperatures until it forms a mucilaginous mass, permitting the resulting mass to remain quiescent for such length of time as is necessary to obtain a substantial yield of caoutchouc-like material, and then coagulating the resulting caoutchouc-like material by treatment with a coagulant.

18. The method of making caoutchouc-like material which comprises introducing starch and a metallic soap having substantially water-repellent power into an aqueous solution of calcium chloride and agitating the resulting mixture maintained at temperatures not substantially higher than room temperatures until it forms a mucilaginous mass, treating said mass with a solvent of the metallic soap, permitting the so-treated mass to remain quiescent for such length of time as is necessary to obtain a substantial yield of caoutchouc-like material, and then coagulating the resulting caoutchouc-like material by treatment with a coagulant.

19. The method of making caoutchouc-like material which comprises introducing starch and aluminum palmitate into an aqueous solution of zinc chloride and agitating the resulting mixture maintained at temperatures not substantially higher than room temperatures until it forms a mucilaginous mass, treating said mass with benzol, permitting the so-treated mass to remain quiescent for such length of time as is necessary to obtain a substantial yield of caoutchouc-like material, and then coagulating the resulting caoutchouc-like material by treatment with an aqueous solution of formic acid.

20. The method of making caoutchouc-like material which comprises introducing starch and an aluminum palmitate into an aqueous solution of calcium chloride and zinc chloride and agitating the resulting mixture maintained at temperatures not substantially higher than room temperatures until it forms a mucilaginous mass, treating said mass with benzol, permitting the so-treated mass to remain quiescent for such length of time as is necessary to obtain a substantial yield of caoutchouc-like material, and then coagulating the resulting caoutchouc-like material by treatment with formic acid.

ROBERT BEYER.